United States Patent
Yokoyama et al.

(10) Patent No.: US 11,453,304 B2
(45) Date of Patent: Sep. 27, 2022

(54) MANAGEMENT APPARATUS, MANAGEMENT METHOD, AND PROGRAM

(71) Applicant: HONDA MOTOR CO., LTD., Tokyo (JP)

(72) Inventors: Shinichi Yokoyama, Wako (JP); Yusaku Amari, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 314 days.

(21) Appl. No.: 16/881,048

(22) Filed: May 22, 2020

(65) Prior Publication Data

US 2020/0384876 A1 Dec. 10, 2020

(30) Foreign Application Priority Data

May 28, 2019 (JP) .............................. JP2019-099258

(51) Int. Cl.
*H02J 7/00* (2006.01)
*B60L 53/60* (2019.01)
*B60L 55/00* (2019.01)
*H02J 7/14* (2006.01)
*B60L 58/10* (2019.01)

(52) U.S. Cl.
CPC ............... *B60L 53/60* (2019.02); *B60L 55/00* (2019.02); *H02J 7/0069* (2020.01); *H02J 7/1446* (2013.01); *B60L 58/10* (2019.02); *G05B 2219/37165* (2013.01)

(58) Field of Classification Search
None
See application file for complete search history.

(56) References Cited

U.S. PATENT DOCUMENTS 6,137,250 A * 10/2000 Hirano ................. B60W 20/00
                                                    318/140
6,833,784 B1 * 12/2004 Ishii ....................... B60R 25/20
                                                    340/5.31

(Continued)

FOREIGN PATENT DOCUMENTS

JP          06-255428          9/1994
JP          2018-055906        4/2018

(Continued)

OTHER PUBLICATIONS

Japanese Office Action for Japanese Patent Application No. 2019-099258 dated Feb. 22, 2022.

*Primary Examiner* — Arun C Williams
(74) *Attorney, Agent, or Firm* — Amin, Turocy & Watson, LLP

(57) ABSTRACT

A management apparatus manages electric power transfer between a power system and a secondary battery mounted in a vehicle and storing electric power for traveling. The management apparatus includes a storage configured to store an upper limit number of rotations of a rotating machine included in the vehicle, and a controller configured to acquire an integrated number of rotations of the rotating machine that is measured from a start time of a warranty period of the vehicle and to limit electric power transfer between the power system and the secondary battery when the integrated number of rotations is equal to or greater than the upper limit number of rotations.

8 Claims, 7 Drawing Sheets

|  | UPPER LIMIT CONDUCTION TIME [h] | UPPER LIMIT NUMBER OF IGNITIONS [TIMES] | UPPER LIMIT NUMBER OF ROTATIONS [TIMES] |
|---|---|---|---|
| WARRANTY PERIOD (FOR N YEARS) | 54756 | 16500 | 900 MILLIONS |
| AVERAGE PER YEAR | 3650.4 | 1100 | 60,000,000 |
| AVERAGE PER WEEK | 70.00 | 21.1 | 1,150,685 |
| AVERAGE PER DAY | 10.00 | 3.0 | 164,383 |

(56) References Cited

U.S. PATENT DOCUMENTS

| | | | | |
|---|---|---|---|---|
| 2002/0149332 A1* | 10/2002 | Inagaki | ............... | B60L 50/60 |
| | | | | 318/432 |
| 2008/0051949 A1* | 2/2008 | Seo | ............... | B60W 20/10 |
| | | | | 701/22 |
| 2015/0266384 A1* | 9/2015 | Kitanaka | ............... | B60L 9/22 |
| | | | | 318/400.3 |
| 2015/0314685 A1* | 11/2015 | Imamura | ............... | B60L 55/00 |
| | | | | 318/504 |

FOREIGN PATENT DOCUMENTS

| | | |
|---|---|---|
| JP | 2019-041481 | 3/2019 |
| WO | 2017/009978 | 1/2017 |

\* cited by examiner

FIG. 2

| ROTATING MACHINE | INTEGRATED NUMBER OF ROTATIONS [TIMES] |
|---|---|
| RADIATOR FAN | FFFF |
| WATER PUMP | PPPP |
| ... | ... |

FIG. 3

| | [TIMES] |
|---|---|
| INTEGRATED NUMBER OF IGNITIONS | GGGG |

FIG. 4

| | UPPER LIMIT CONDUCTION TIME [h] | UPPER LIMIT NUMBER OF IGNITIONS [TIMES] | UPPER LIMIT NUMBER OF ROTATIONS [TIMES] |
|---|---|---|---|
| WARRANTY PERIOD (FOR N YEARS) | 54756 | 16500 | 900 MILLIONS |
| AVERAGE PER YEAR | 3650.4 | 1100 | 60,000,000 |
| AVERAGE PER WEEK | 70.00 | 21.1 | 1,150,685 |
| AVERAGE PER DAY | 10.00 | 3.0 | 164,383 |

FIG. 6

| | UPPER LIMIT CONDUCTION TIME [h] | | UPPER LIMIT NUMBER OF IGNITIONS [TIMES] | | UPPER LIMIT NUMBER OF ROTATIONS [TIMES] | |
|---|---|---|---|---|---|---|
| | CARRY-OVER | UPPER LIMIT VALUE | CARRY-OVER | UPPER LIMIT VALUE | CARRY-OVER | UPPER LIMIT VALUE |
| WARRANTY PERIOD (FOR N YEARS) | - | 54756 | - | 16500 | - | 900 MILLION |
| AVERAGE VALUE PER YEAR | | 3650.4 | | 1100 | | 60,000,000 |
| AVERAGE VALUE PER WEEK | | 70.00 | | 21.1 | | 1,150,685 |
| AVERAGE VALUE PER DAY | | 10.00 | | 3.0 | | 164,383 |

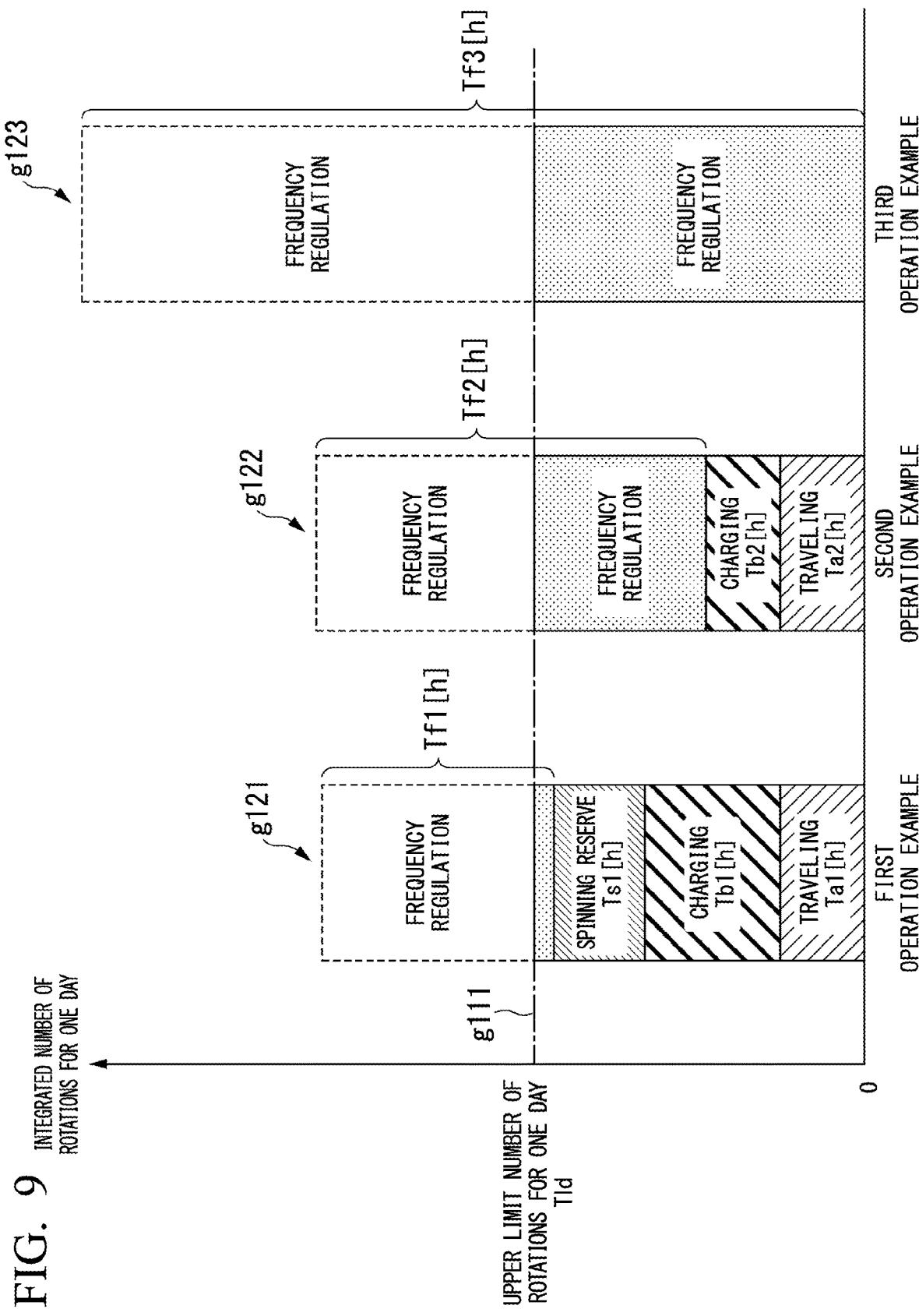

MANAGEMENT APPARATUS, MANAGEMENT METHOD, AND PROGRAM

CROSS-REFERENCE TO RELATED APPLICATION

Priority is claimed on Japanese Patent Application No. 2019-099258, filed May 28, 2019, the content of which is incorporated herein by reference.

BACKGROUND OF THE INVENTION

Field of the Invention

The present invention relates to a management apparatus, a management method, and a program.

Description of Related Art

Recently, electrically driven vehicles have become widely used. Electrically driven vehicles include a battery (e.g., a secondary battery) mounted therein which is charged with electricity and travel using electric power supplied from the secondary battery to a motor. Accordingly, electrically driven vehicle users charge secondary batteries of electrically driven vehicles at charging stations installed in various places, their houses, and the like.

In addition, a social system called vehicle-to-grid (V2G) has been proposed. In V2G, electric power interchange between a power system including a commercial power network and electrically driven vehicles is performed (refer to Japanese Unexamined Patent Application, First Publication No. 2019-41481). In V2G, a secondary battery mounted in an electrically driven vehicle is used as a power storage facility in a commercial power network when the electrically driven vehicle is not used as a transportation means. Accordingly, bidirectional electric power transfer between electrically driven vehicles and a power system participating in V2G is performed. Further, for example, components including rotating mechanisms such as a radiator fan and a water pump used for cooling are used in such electrically driven vehicles.

SUMMARY OF THE INVENTION

As described above, electric power is supplied from a secondary battery to a power system in V2G, and thus operating time of components mounted in an electrically driven vehicle increases as compared to a case in which V2G is not performed. However, since conventional technology does not consider durability of rotating machines such as a radiator fan and a water pump, traveling may be disturbed when the number of rotations of a rotating machine reaches an upper limit value.

An object of aspects of the present invention devised in view of such circumstances is to provide a management apparatus, a management method, and a program which can allow electric power transfer between a vehicle and a power system within a range in which the vehicle can travel.

To solve the aforementioned problem to accomplish such an object, the present invention employs the following aspects.

(1): A management apparatus according to an aspect of the present invention is a management apparatus which manages electric power transfer between a power system and a secondary battery mounted in a vehicle and storing electric power for traveling, the management apparatus including a storage configured to store an upper limit number of rotations of a rotating machine included in the vehicle, and a controller configured to acquire an integrated number of rotations of the rotating machine that is measured from a start time of a warranty period of the vehicle and to limit electric power transfer between the power system and the secondary battery when the integrated number of rotations is equal to or greater than the upper limit number of rotations.

(2): In the aspect of (1), when the controller limits electric power transfer between the power system and the secondary battery, the controller may not limit electric power supply from the power system to the secondary battery and may limit electric power supply from the secondary battery to the power system.

(3): In the aspect of (1) or (2), the integrated number of rotations may be a value obtained by integrating a number of rotations of the rotating machine when the vehicle is traveling, a number of rotations of the rotating machine during charging of the secondary battery performed in order to increase a remaining capacity of the secondary battery to a predetermined level, and a number of rotations of the rotating machine when changing/discharging is performed between the secondary battery and the power system.

(4): In the aspect of any one of (1) to (3), the controller may calculate an upper limit number of rotations in a unit period, calculate a difference between the integrated number of rotations in a first unit period and a number of rotations of the rotating machine in the unit period, and correct an upper limit number of rotations in a second unit period after the first unit period on the basis of the difference.

(5): In the aspect of any one of (1) to (4), the storage may further store an upper limit conduction time with respect to an electrical apparatus included in the vehicle, and the controller may acquire an integrated conduction time of the electrical apparatus measured from the start time of the warranty period of the vehicle and limit electric power transfer between the power system and the secondary battery even when the integrated conduction time is equal to or greater than the upper limit conduction time.

(6): In the aspect of any one of (1) to (5), the storage may further store an upper limit number of times of switching between an on state and an off state of an ignition key included in the vehicle, and the controller may acquire an integrated number of times of switching between the on state and the off state of the ignition key that is measured from the start time of the warranty period of the vehicle and limit electric power transfer between the power system and the secondary battery even when the integrated number of times of switching is equal to or greater than the upper limit number of times of switching.

(7): A management method according to an aspect of the present invention is a management method by which a management apparatus which manages electric power transfer between a power system and a secondary battery mounted in a vehicle and storing electric power for traveling and includes a storage configured to store an upper limit number of rotations of a rotating machine included in the vehicle acquires an integrated number of rotations of the rotating machine that is measured from a start time of a warranty period of the vehicle and limits electric power transfer between the power system and the secondary battery when the integrated number of rotations is equal to or greater than the upper limit number of rotations.

(8): A computer-readable non-transitory storage medium according to an aspect of the present invention stores a program causing a computer of a management apparatus which manages electric power transfer between a power system and a secondary battery mounted in a vehicle and storing electric power for traveling and includes a storage configured to store an upper limit number of rotations of a rotating machine included in the vehicle to acquire an integrated number of rotations of the rotating machine that is measured from a start time of a warranty period of the vehicle and to limit electric power transfer between the power system and the secondary battery when the integrated number of rotations is equal to or greater than the upper limit number of rotations.

According to the aspects of (1) to (8), it is possible to transfer electric power between the vehicle and the power system within a range in which the vehicle can travel because an integrated number of the number of rotations of the rotating machine of the vehicle is acquired and compared with the upper limit number of rotations.

According to the aspect of (2), it is possible to secure electric power necessary for travel of the vehicle because supply of electric power to the vehicle is not limited.

According to the aspect of (3), it is possible to operate electric power transfer between the power system and the secondary battery in consideration of the performance of the rotating machine by limiting electric power transfer between the power system and the secondary battery on the basis of numbers of rotations during traveling of the vehicle, charging, and power supply to the power system.

According to the aspect of (4), it is possible to efficiently operate electric power transfer between the power system and the secondary battery by correcting the upper limit number of rotations and carrying over a surplus of a number of rotations in the first unit period to the second unit period.

According to the aspect of (5), it is possible to efficiently operate electric power transfer between the power system and the secondary battery in consideration of a conduction period by limiting electric power transfer between the power system and the secondary battery on the basis of a conduction time with respect to the electrical apparatus included in the vehicle.

According to the aspect of (6), it is possible to efficiently operate electric power transfer between the power system and the secondary battery in consideration of a number of times of switching between an on state and an off state of the ignition key by limiting electric power transfer between the power system and the secondary battery on the basis of the number of times of switching between an on state and an off state of the ignition key.

BRIEF DESCRIPTION OF THE DRAWINGS

FIG. 2 is a diagram showing an example of integrated numbers of rotations of rotating machines stored in a vehicle storage according to the embodiment.

FIG. 3 is a diagram showing an example of an integrated number of ignitions stored in the vehicle storage according to the embodiment.

FIG. 4 is a diagram showing an example of information stored in a storage of the management apparatus according to the embodiment.

FIG. 6 is a diagram showing an example of upper limit values stored in a storage of a management apparatus according to a modified example of the embodiment.

FIG. 9 is a diagram showing a number of rotations for each operation example shown in FIG. 8 when charging/discharging of an on-board battery is managed such that a number of rotations for one day falls within an upper limit number of rotations for one day.

DETAILED DESCRIPTION OF THE INVENTION

Hereinafter, an embodiment of a management apparatus, a management method, and a program of the present invention will be described with reference to the drawings. Although it is assumed that a vehicle is an electric vehicle having a secondary battery mounted therein in the following description, the vehicle may be a vehicle which can be externally charged and includes a secondary battery for supplying electric power for traveling mounted therein, a hybrid vehicle, or a fuel battery vehicle.

[Overview of V2G System]

First, an overview of a vehicle-to-grid (V2G) system will be described. The V2G system performs electric power interchange between a power system including a commercial power network and vehicles. In the V2G system, a secondary battery mounted in a vehicle is used as a power storage facility when the vehicle is not used as a means of transportation. Accordingly, bidirectional electric power transfer between a vehicle and a power system participating in V2G is performed.

A vehicle participating in V2G performs continuous discharging to maintain supply-demand balance in the power system or charging/discharging for stabilizing the frequency in the power system according to a situation of the power system. Electric power obtained according to continuous discharging of the vehicle to maintaining supply-demand balance is used as a "spinning reserve" of the power system. Continuous discharging for this spinning reserve is performed, particularly, for the purpose of power supply to the power system necessary to maintain supply-demand balance according to increase in power demand in the power system. In addition, electric power transferred according to charging/discharging of the vehicle for stabilizing the frequency is used for "frequency adjustment (frequency regulation)" of the power system. In both cases, the vehicle contributes to stabilization of the power system.

[Overall Configuration]

Figure 1:
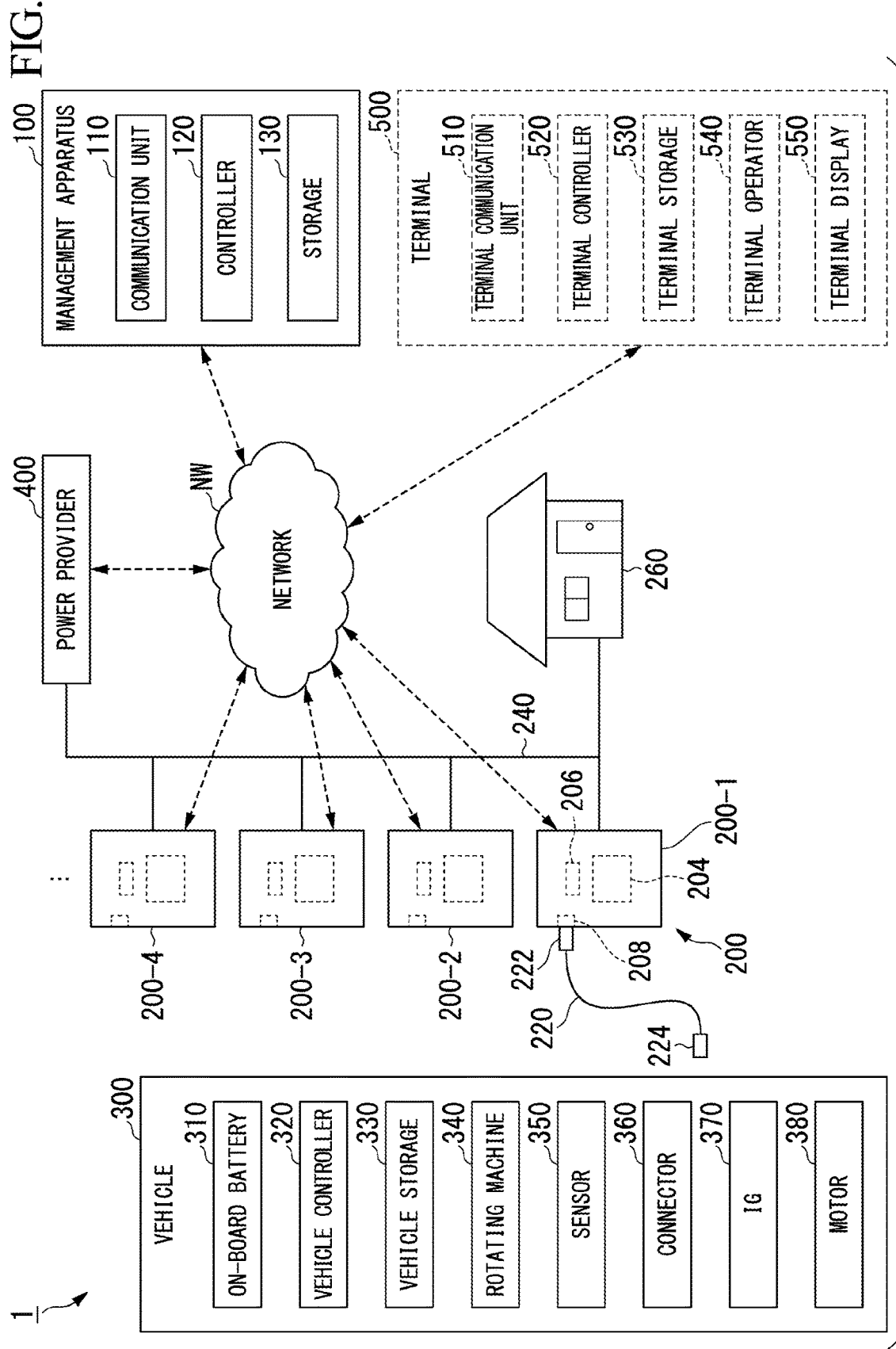
FIG. 1 is a diagram showing an example of a configuration and a service environment of a V2G system including a management apparatus according to an embodiment.

FIG. 1 is a diagram showing an example of a configuration and a service environment of a V2G system 1 including a management apparatus 100 according to the present embodiment. As shown in FIG. 1, the V2G system 1 includes the management apparatus 100, a plurality of external power supply apparatuses 200 (200-1, 200-2, 200-3, 200-4, . . . ), a vehicle 300, a power provider 400, and a terminal 500. Meanwhile, the external power supply apparatuses 200-1, 200-2, 200-3, 200-4, . . . are represented as the external power supply apparatus 200 when one thereof is not specified in the following description. Further, although the single vehicle 300 is shown in FIG. 1, a plurality of vehicles 300 may be provided. In addition, a plurality of terminals 500 may be provided.

An example of a service environment of the V2G system 1 will be described with reference to FIG. 1.

The external power supply apparatus 200 is installed, for example, in a house 260 of a user of the vehicle 300, a company that the user works for, accommodations used by the user, and the like. For example, the user connects the vehicle 300 to the external power supply apparatus 200 when he/she returns home. The management apparatus 100 performs control such that electric power is supplied to the vehicle 300 through the external power supply apparatus 200 and electric power interchange between a power system including a commercial power network and electrically driven vehicles is performed. The external power supply apparatus 200 is connected to the power provider 400 through a power transmission line 240. The management apparatus 100 is connected to the external power supply apparatus 200 through a network NW. In addition, the vehicle 300 is connected to the external power supply apparatus 200 through a cable 220. Meanwhile, the cable 220 is a feed cable and may include a signal line. Alternatively, the cable 220 may be a feed cable having signals superimposed thereon. Further, the network NW includes, for example, the Internet, a wide area network (WAN), a local area network (LAN), a provider device, a wireless base station, and the like.

[Power Provider 400]

The power provider 400 includes a power plant that generates power using energy such as firepower, wind power, nuclear power, or solar power and supplies electric power to an allocated area, for example. Here, a method of defining an area is not limited and an area may be defined, for example, using an administrative district such as a prefecture, a city, a town or a village as a unit or using a jurisdiction of a substation as a unit. The power provider 400 transmits an instruction (provision of frequency regulation and spinning reserve) with respect to charging/discharging of an on-board battery 310 mounted in the vehicle 300 to the management apparatus 100 through the network NW in response to power demand Meanwhile, the example shown in FIG. 1 is an example in which there is a single area and a single power provider 400.

[Management Apparatus 100]

The management apparatus 100 includes a communication unit 110, a controller 120, and a storage 130.

The management apparatus 100 communicates with the power provider 400 through the network NW. The management apparatus 100 communicates with the plurality of external power supply apparatuses 200 through the network NW. The management apparatus 100 manages electric power on the basis of information transmitted from the power provider 400.

The communication unit 110 receives a request from the power provider 400 through the network NW. The request received from the power provider 400 is, for example, a frequency regulation request or a spinning reserve request. The communication unit 110 outputs the received frequency regulation request or spinning reserve request to the controller 120. The communication unit 110 transmits/receives information to/from the external power supply apparatus 200 through the network NW. The communication unit 110 transmits information on V2G participation, a frequency regulation instruction or a spinning reserve instruction output from the controller 120 to the external power supply apparatus 200 through the network NW. The communication unit 110 outputs, to the controller 120, integrated conduction time that is integration time of conduction time (conduction period) received from the external power supply apparatus 200, an integrated number of ignitions (also referred to as an integrated number of times of switching) that is an integrated number of times of switching between an on state and an off state of an ignition key included in the vehicle 300, and an integrated number of rotations that is integration of numbers of rotations of a rotating machine 340 included in the vehicle 300.

The controller 120 acquires the integrated conduction time, the integrated number of ignitions, and the integrated number of rotations output from the communication unit 110. The controller 120 determines whether to permit V2G operation on the basis of the integrated conduction time, the integrated number of ignitions, and the integrated number of rotations output from the communication unit 110 and information stored in the storage 130. Meanwhile, a method of determining whether to permit V2G operation will be described later. The controller 120 outputs a determination result to the communication unit 110 having the external power supply apparatus 200 as a transmission destination. In addition, the controller 120 acquires a frequency regulation request (an instruction for controlling V2G operation with respect to a secondary battery) or a spinning reserve request (an instruction for controlling V2G operation with respect to the secondary battery) output from the communication unit 110. The controller 120 regards the frequency regulation request output from the communication unit 110 as a frequency regulation instruction and outputs the frequency regulation instruction to the communication unit 110 having the external power supply apparatus 200 as a transmission destination. The controller 120 regards the spinning reserve request output from the communication unit 110 as a spinning reserve instruction and outputs the spinning reserve instruction to the communication unit 110 having the external power supply apparatus 200 as a transmission destination.

The storage 130 stores an upper limit conduction time (h (hour)), an upper limit number of times of numbers of ignitions (upper limit number of ignitions) (times), and an upper limit number of rotations (times) of the rotating machine 340 in association with one another. Meanwhile, information stored in the storage 130 will be described later.

[External Power Supply Apparatus 200]

The external power supply apparatus 200 includes a housing 202, a control device 204, a communication unit 206, and a cable connection port 208.

The housing 202 includes the control device 204 and the communication unit 206.

The control device 204 detects connection of the vehicle 300 to the external power supply apparatus 200. The control device 204 may detect whether the vehicle 300 is connected to the external power supply apparatus 200, for example, on the basis of a voltage value of the cable 220, or transmit a signal at predetermined time intervals and detect connection when there is a response to the signal. When the vehicle 300 is connected to the external power supply apparatus 200, the control device 204 acquires an integrated conduction time, an integrated number of ignitions and an integrated number of rotations output from the vehicle 300 through the cable 220 and the cable connection port 208. The control device 204 outputs the acquired integrated conduction time, integrated number of ignitions and integrated number of rotations to the communication unit 206 having the management apparatus 100 as a transmission destination. The control device 204 outputs information on V2G participation, a frequency regulation instruction, or a spinning reserve instruction output from the communication unit 206 to the vehicle 300 through the cable 220 and the cable connection port 208. The control device 204 performs control such that V2G participation is performed or V2G participation is limited on the basis of a V2G control instruction output from the communication unit 206.

The communication unit 206 receives a V2G control instruction, a frequency regulation instruction or a spinning reserve instruction transmitted from the management apparatus 100 through the network NW and outputs the received V2G control instruction, frequency regulation instruction or spinning reserve instruction to the control device 204. The communication unit 206 transmits the integrated conduction time, the integrated number of ignitions, and the integrated number of rotations to the management apparatus 100 through the network NW.

The cable connection port 208 is formed by opening the outer surface of the housing 202. The cable 220 is connectable to the cable connection port 208.

The cable 220 includes a first plug 222 and a second plug 224. The first plug 222 is connected to the cable connection port 208 of the external power supply apparatus 200 and the second plug 224 is connected to a connector 360 of the vehicle 300.

[Vehicle 300]

The vehicle 300 includes an on-board battery (secondary battery) 310, a vehicle controller 320, a vehicle storage 330, a rotating machine 340, a sensor 350, the connector 360 (transceiver), an IG 370, and a motor 380. Further, the vehicle 300 includes a temperature sensor, a voltage sensor, a current sensor, an inverter, a transmission, a vehicle wheels, and the like which are not shown.

The on-board battery 310 is, for example, a secondary battery such as a lithium ion battery. The on-board battery 310 stores electric power and discharges the stored electric power according to control of the vehicle controller 320.

The vehicle controller 320 calculates an integrated number of rotations on the basis of a detection result output from the sensor 350 or an instruction value for the rotating machine 340 and causes the vehicle storage 330 to store the calculated integrated number or rotations. The vehicle controller 320 causes the vehicle storage 330 to store an integrated conduction time for the on-board battery 310, the rotating machine 340, and the like. The vehicle controller 320 counts the number of ignitions on the basis of information representing an on state or an off state output from the IG 370 and causes the vehicle storage 330 to store the counted integrated number of ignitions. When the vehicle 300 is connected to the external power supply apparatus 200, the vehicle controller 320 outputs the integrated conduction time, the integrated number of ignitions, and the integrated number of rotations to the external power supply apparatus 200 through the connector 360 and the cable 220. When the vehicle 300 is not connected to the external power supply apparatus 200, the vehicle controller 320 supplies electric power to the motor 380 that is a driving source of the vehicle 300 and other devices that require electricity and are not shown. In addition, when the vehicle 300 is connected to the external power supply apparatus 200, the vehicle controller 320 performs charging/discharging in response to a request from the management apparatus 100 or charging for increasing a state or charge (SOC) that is a variable representing a charge/discharge state of the on-board battery 310 as a percentage to a preset level. Meanwhile, when the SOC is 100%, the on-board battery 310 is in a full charge state. Further, the vehicle controller 320 also outputs, for example, registration date and time information representing a date and time when the vehicle 300 has been registered to the external power supply apparatus 200 through the connector 360 and the cable 220.

Meanwhile, an conduction integration time T of the rotating machine 340 is a value obtained by integrating an conduction time (travel conduction time) Ta of an electrical apparatus during travel of the vehicle 300 performed during a predetermined unit period or from a start time of a warranty period of the vehicle 300 to the current time, a conduction time (charge conduction time) Tb of the rotating machine 340 during charging of the on-board battery 310 performed in order to increase the SOC of the on-board battery 310 to a predetermined level (e.g., SOC of 100%) in a state in which the vehicle 300 is connected to the external power supply apparatus 200, and a conduction time (V2G conduction time) Tc of the electrical apparatus during charging/discharging of the on-board battery 310 in response to a request from the management apparatus 100 in a state in which the vehicle 300 is connected to the external power supply apparatus 200. That is, a relation of "T=Ta+Tb+Tc" is established. In addition, the V2G conduction time Tc is a total value of a conduction time (frequency regulation conduction time) Tf of the electrical apparatus during short-term charging/discharging for performing frequency regulation of a power network and a conduction time (spinning reserve conduction time) Ts of the electrical apparatus during continuous discharging for providing spinning reserve to the power network. That is, a relation of "Tc=Tf+Ts" is established.

The vehicle storage 330 stores the integrated conduction time, the integrated number of rotations, and the integrated number of ignitions. Meanwhile, information stored in the vehicle storage 330 will be described later.

The rotating machine 340 is a rotating machine mounted in the vehicle 300, such as a radiator fan and a water pump. Meanwhile, power sources of the radiator fan and the water pump are the on-board battery 310 and the motor 380. The water pump cools peripheral devices mounted in the vehicle 300, for example. The radiator fan cools the on-board battery 310 and the like during quick charging and the like, for example. Rotation of the rotating machine 340 is controlled by the vehicle controller 320.

The sensor 350 detects the number of rotations of the rotating machine 340 and outputs the detected number of rotations to the vehicle controller 320.

The connector 360 is connected to the second plug 224 of the external power supply apparatus 200.

The IG 370 is an ignition key. The IG 370 outputs information representing an on state or an off state to the vehicle controller 320.

The motor 380 generates power for travel of the vehicle 300 according to control of the vehicle controller 320.

[Terminal 500]

The terminal 500 includes a terminal communication unit 510, a terminal controller 520, a terminal storage 530, a terminal operator 540, and a terminal display 550.

The terminal 500 is, for example, a smartphone, a tablet terminal, or the like. The terminal 500 receives incentive information transmitted from the management apparatus 100 through the network NW and announces the received incentive information. Meanwhile, the terminal 500 may additionally include a vibrator, an acceleration sensor, a global positioning system (GPS) receiver, and the like. Further, the terminal 500 is used by, for example, a user of the vehicle 300.

The terminal communication unit 510 receives incentive information transmitted from the management apparatus 100 through the network NW and outputs the received incentive information to the terminal controller 520.

The terminal controller 520 receives the incentive information output from the terminal communication unit 510. The terminal controller 520 generates image information for announcing an incentive result on the basis of the received incentive information and outputs the generated image information to the terminal display 550. In addition, the terminal controller 520 acquires an operation result output from the terminal operator 540 and starts, for example, an application according to the acquired operation result. Meanwhile, the incentive result is displayed, for example, on the application.

The terminal storage 530 stores, for example, an operating system (OS) necessary for operation of the terminal 500, applications, terminal identification information, user identification information, and the like.

The terminal operator 540 is, for example, a touch panel sensor provided on the terminal display 550. The terminal operator 540 detects an operation result of a user and outputs the detected operation result to the terminal controller 520.

The terminal display 550 is, for example, a liquid crystal display device, an organic electroluminescence (EL) display device, or the like. The terminal display 550 displays image information output from the terminal controller 520.

Example of Information Stored in the Vehicle Storage 330

Next, an example of information stored in the vehicle storage 330 will be described. FIG. 2 is a diagram showing an example of an integrated number of rotations of the rotating machine 340 stored in the vehicle storage 330 according to the present embodiment. As shown in FIG. 2, the vehicle storage 330 stores, for example, an integrated number of rotations for one year in association with each rotating machine 340. Meanwhile, the vehicle storage 330 may store an integrated number of rotations in association with information representing a date and time when it is stored.

FIG. 3 is a diagram showing an example of an integrated number of ignitions stored in the vehicle storage 330 according to the present embodiment. As shown in FIG. 3, the vehicle storage 330 stores, for example, the number of ignitions for one year. Meanwhile, the vehicle storage 330 may store a integrated number of ignitions in association with information representing a date and time when it is stored.

Meanwhile, although the integration periods in the examples shown in FIG. 2 and FIG. 3 are one year, integration periods are not limited thereto. Integration periods may be, for example, one month, one week, or one day.

Example of Information Stored in the Storage 130 of Management Apparatus 100

Next, an example of information stored in the storage 130 of the management apparatus 100 will be described. FIG. 4 is a diagram showing an example of information stored in the storage 130 of the management apparatus 100 according to the present embodiment. As shown in FIG. 4, the storage 130 stores an upper limit conduction time (h (hour)) (e.g., 54,756 hours), an upper limit number of ignitions (times) (e.g., 16,500 times), and an upper limit number of rotations (e.g., 900 million times) in association with a warranty period (N years). In addition, the storage 130 stores an upper limit conduction time (h) per year (e.g., 54,756 hours/N years), an upper limit number of ignitions (times) per year (e.g., 16,500 times/N years), and an upper limit number of rotations (times) per year (900 million times/N years) in association with an item of the average per year. Further, the storage 130 stores an upper limit conduction time (h) per week (e.g., 54,756 hours/N years/52), an upper limit number of ignitions (times) per week (e.g., 16,500 times/N years/52), and an upper limit number of rotations (times) per week (900 million times/N years/52) in association with an item of the average per week. In addition, the storage 130 stores an upper limit conduction time (h) per day (e.g., 54,756 hours/N years/52/7), an upper limit number of ignitions (times) per day (e.g., 16,500 times/N years/52/7), and an upper limit number of rotations (times) per day (900 million times/N years/52/7) in association with an item of the average per day. Meanwhile, an upper limit number of ignitions is a number of time of a component of the ignition key which has a lowest upper limit number of times that it can be used among components constituting the ignition key. In addition, an upper limit number of rotations is an upper limit number of rotations of a rotating machine 340 having a lowest upper limit number of times that it can be used among rotating machines 340, or an upper limit number of rotations of each rotating machine 340. The upper limit number of rotations is set, for example, on the basis of specifications (e.g., conduction time) of components of the rotating machine 340. In this manner, upper limit values stored in the storage 130 may be upper limit values in the entire warranty period or upper limit values in a predetermined period (one year, one month, one week, or one day) in the present embodiment. Meanwhile, upper limit values for one week are an upper limit conduction time, an upper limit number of ignitions and an upper limit number of rotations of averages per week.

[V2G Operation Control Method]

Figure 5:
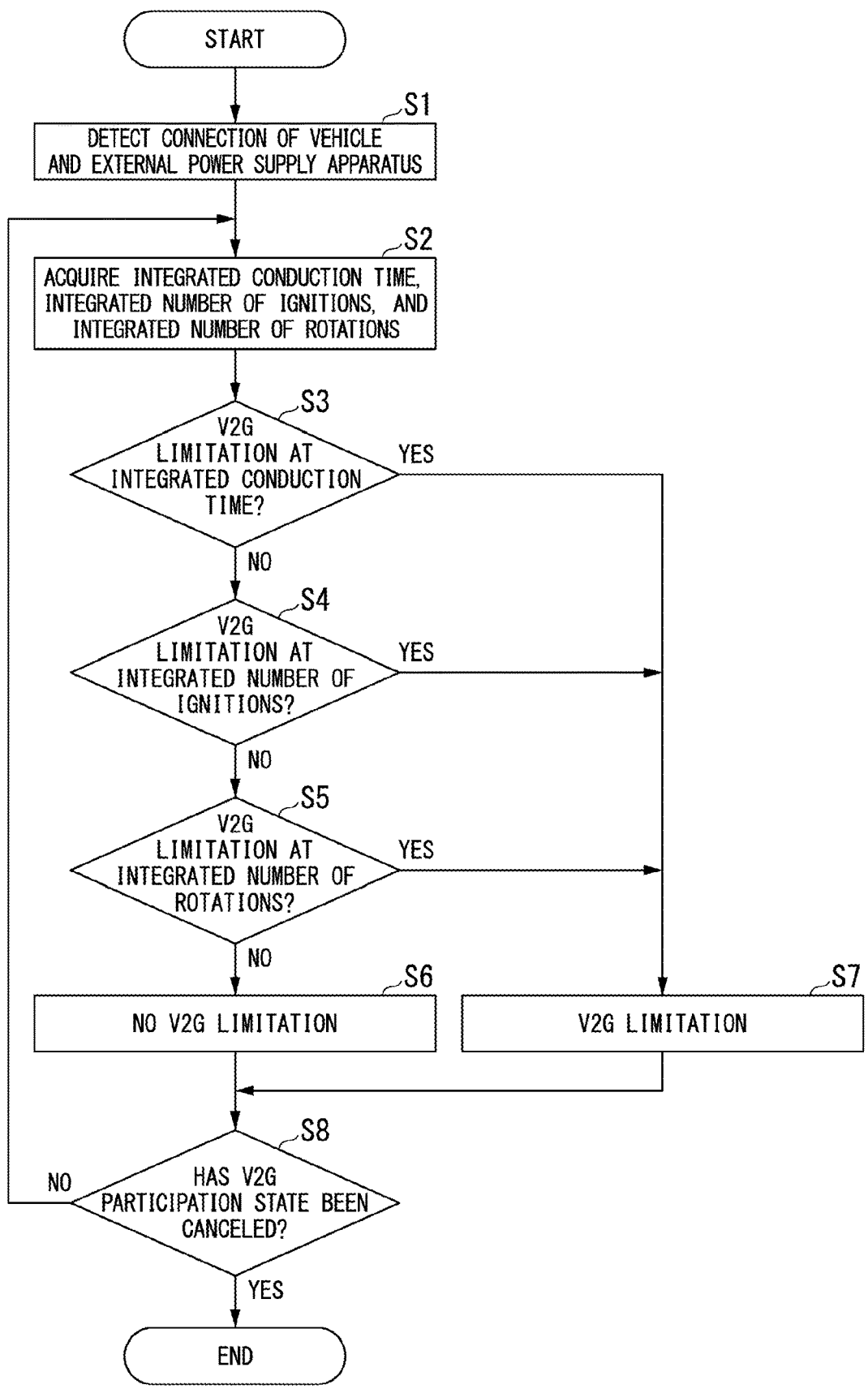
FIG. 5 is a flowchart of an example of a processing procedure of a V2G system according to the embodiment.

In order for the durability of the rotating machine 340 to satisfy the warranty period of the vehicle 300, it is necessary to control charging/discharging of the on-board battery 310 such that a conduction integration time T of each of predetermined unit periods (one year, one month, one week and one day) of the rotating machine 340 falls within an upper limit number of rotations corresponding thereto. Meanwhile, when participating in V2G operation, the rotating machine 340 also rotates during V2G operation in addition to a travel state of the vehicle 300. Accordingly, the management apparatus 100 controls V2G operation as follows on the basis of a conduction integration time, an integrated number of ignitions, and an integrated number of rotations in the present embodiment. FIG. 5 is a flowchart of an example of a processing procedure of the V2G system 1 according to the present embodiment.

First, the control device 204 of the external power supply apparatus 200 detects connection of the vehicle 300 to the external power supply apparatus 200 (step S1).

Then, the control device 204 of the external power supply apparatus 200 acquires an integrated conduction time, an integrated number of ignitions and an integrated number of rotations output from the vehicle 300 through the cable 220 and the cable connection port 208 when the vehicle 300 is connected. Subsequently, the control device 204 transmits the integrated conduction time, the integrated number of ignitions and the integrated number of rotations to the management apparatus 100 through the network NW. Meanwhile, the transmitted information includes, for example, identification information for identifying the vehicle 300 or identification information for identifying the external power supply apparatus 200. Subsequently, the controller 120 of the management apparatus 100 acquires the integrated conduction time, the integrated number of ignitions and the integrated number of rotations transmitted from the external power supply apparatus 200 through the network NW (step S2).

Then, the controller 120 of the management apparatus 100 compares the acquired integrated conduction time with an upper limit conduction time stored in the storage 130 and determines whether to limit V2G operation at the integrated conduction time (step S3).

When it is determined that the integrated conduction time is less than the upper limit conduction time and V2G limitation will not be performed in step S3, the controller 120 of the management apparatus 100 compares the acquired integrated number of ignitions with an upper limit number of ignitions stored in the storage 130 and determines whether to limit V2G operation at the integrated number of ignitions (step S4).

When it is determined that the integrated number of ignitions is less than the upper limit number of ignitions and V2G limitation will not be performed in step S4, the controller 120 of the management apparatus 100 compares the acquired integrated number of rotations with an upper limit number of rotations stored in the storage 130 and determines whether to limit V2G operation with the integrated number or rotations (step S5).

When it is determined that the integrated number of rotations is less than the upper limit number of rotations and V2G limitation will not be performed in step S5, the controller 120 of the management apparatus 100 does not perform V2G limitation, that is, permits participation in V2G. Subsequently, the controller 120 generates a V2G control instruction representing permission of participation in V2G and transmits the generated V2G control instruction to the external power supply apparatus 200 through the communication unit 110 and the network NW. Then, the control device 204 of the external power supply apparatus 200 performs control to permit participation in V2G according to the received V2G control instruction (step S6). Meanwhile, the vehicle controller 320 of the vehicle 300 may perform control to permit participation in V2G according to the V2G control instruction output from the external power supply apparatus 200. Further, the vehicle controller 320 of the vehicle 300 continues integration of the conduction time, the number of ignitions and the number of rotations.

When it is determined that the integrated conduction time is equal to or greater than the upper limit conduction time and V2G limitation will be performed in step S3, when it is determined that the integrated number of ignitions is equal to or greater than the upper limit number of ignitions and V2G limitation will be performed in step S4, or when it is determined that the integrated number of rotations is equal to or greater than the upper limit number of rotations and V2G limitation will be performed in step S5, the controller 120 of the management apparatus 100 performs V2G limitation. That is, the controller 120 generates a V2G control instruction representing that participation in V2G is not permitted. Subsequently, the controller 120 transmits the generated V2G control instruction to the external power supply apparatus 200 through the communication unit 110 and the network NW. Then, the control device 204 of the external power supply apparatus 200 performs control so that only charging is performed according to the received V2G control instruction (step S7). Further, the vehicle controller 320 of the vehicle 300 may perform control so that only charging is performed according to the V2G control instruction output from the external power supply apparatus 200. Meanwhile, the controller 120 may output at least one of an instruction representing that V2G limitation will be performed and an instruction representing that V2G limitation will not be performed to the external power supply apparatus 200 as a V2G control instruction.

As described above, in the present embodiment, the controller 120 limits power supply from the on-board battery 310 to the power system without limiting power supply from the power system to the on-board battery 310 when transfer of electric power between the power system and the on-board battery 310 is limited. Therefore, according to the present embodiment, it is possible to limit transfer of electric power between the power system and the on-board battery 310 while securing electric power necessary for travel of a vehicle.

Next, the control device 204 of the external power supply apparatus 200 detects a connection state of the vehicle 300 and the external power supply apparatus 200 and transmits a detected result to the management apparatus 100 through the network NW. Subsequently, the controller 120 of the management apparatus 100 determines whether a V2G participation state has been cancelled on the basis of information output from the external power supply apparatus 200 (step S8). Meanwhile, cancellation of the V2G participation state is, for example, a case in which connection of the vehicle 300 and the external power supply apparatus 200 is canceled or a case in which the user operates the vehicle 300 to cancel the V2G participation state.

When it is determined that V2G participation has been cancelled in step S8, the controller 120 of the management apparatus 100 ends processing. Further, the controller 120 receives incentive information from the power provider 400 after V2G operation is performed through the network NW. Then, the controller 120 notifies the user of the incentive information by transmitting the received incentive information to the terminal 500 through the network NW.

Meanwhile, in the process of step S3 of FIG. 5, the controller 120 of the management apparatus 100 may determine whether to perform V2G limitation by comparing, for example, a value obtained by subtracting an upper limit conduction time up to the previous year from the acquired integrated conduction time with the acquired integrated conduction time. The controller 120 may determine that V2G limitation will be performed, for example, when a condition of {(acquired integrated conduction time)−(average conduction time per year)×(number of elapsed years)}≥0 is satisfied. Meanwhile, the amount of elapsed time is calculated on the basis of registration date and time information output from the vehicle 300 and the current date and time. Similarly, in the process of step S4, the controller 120 may determine whether to perform V2G limitation by comparing, for example, a value obtained by subtracting an upper limit number of ignitions up to the previous year from the acquired integrated number of ignitions with the acquired integrated number of ignitions. Similarly, in the process of step S5, the controller 120 may determine whether to perform V2G limitation by comparing, for example, a value obtained by subtracting an upper limit integrated number of rotations up to the previous year from the acquired integrated number of rotations with the acquired integrated number of rotations. Meanwhile, a period for determination is not limited to the yearly unit and may be a monthly unit or a weekly unit.

Meanwhile, although processing shown in FIG. 5 is performed in a case in which a single vehicle and a single external power supply apparatus 200 are provided, the present invention is not limited thereto. The controller 120 of the management apparatus 100 performs the aforementioned processing for each vehicle 300. Further, one or a plurality of vehicles 300 may be connected to the external power supply apparatuses 200. In such a case, the controller 120 may include identification information of the vehicle 300 in a V2G control instruction and transmit the V2G control instruction.

In addition, in processing shown in FIG. 5, the order of the processes of steps S3 to S5 is not limited thereto. For example, the processes may be performed in the order of steps S5, S4 and S3 or in the order of steps S5, S3 and S4. Furthermore, the controller 120 may simultaneously process steps S3 to S5.

As described above, in the present embodiment, an integrated number of rotations during traveling, an integrated number of rotations during charging, an integrated number of rotations during V2G, and the like are integrated in the management apparatus 100 and monitored, and V2G operation is limited so that it does not exceed an upper limit durability.

Therefore, according to the present embodiment, since participation in V2G operation is determined by monitoring the number of rotations of the rotating machine 340, traveling, charging and V2G operation may be performed such that they do not exceed upper limit values.

MODIFIED EXAMPLE

Although an example in which V2G participation is determined by comparing an acquired integrated number of rotations with an upper limit integrated number of rotations is described, for example, in processing described using FIG. 5, the present invention is not limited thereto. For example, there may be cases in which a travel time or a V2G operation time of the previous year is short and the number of rotations is less than an average number of rotations. In a modified example below, an example of carrying over when there is a sufficiently integrated value with respect to an upper limit value will be described.

FIG. 6 is a diagram showing an example of upper limit values stored in the storage 130 of the management apparatus 100 according to the modified example of the present embodiment. As shown in FIG. 6, the storage 130 stores an upper limit conduction time (h (hour)), an upper limit number of ignitions (times), and an upper limit number of rotations (times) in association with a warranty period (N years). In addition, the storage 130 stores a carry-over of a conduction time, an upper limit conduction time (h) per year, a carry-over of the number of ignitions, an upper limit number of ignitions per year (times), a carry-over of the number of rotations, and an upper limit number of rotations (times) per year (900 million times/N years) in association with an item of averages per year. Further, the storage 130 stores a carry-over of a conduction time, an upper limit conduction time (h) per week, a carry-over of the number of ignitions, an upper limit number of ignitions (times) per week, a carry-over of the number of rotations, and an upper limit number of rotations (times) per week in association with an item of averages per week. Further, the storage 130 stores a carry-over of a conduction time, an upper limit conduction time (h) per day, a carry-over of the number of ignitions, an upper limit number of ignitions (times) per day, a carry-over of the number of rotations, and an upper limit number of rotations (times) per day in association with an item of averages per day.

Here, examples of a method of calculating a carry-over and a method of calculating integrated values used for comparison are described. For example, an example of comparing an integrated value for one year with an acquired integrated value is described. The controller 120 of the management apparatus 100 causes the storage 130 to store an integrated conduction time, an integrated number of ignitions, and an integrated number of rotations on December 31, for example. Then, the controller 120 calculates a currently available conduction time using the following equation (1) by adding an average conduction time to a carried over conduction time per year to correct the currently available conduction time.

$$\begin{aligned}\text{(Available conduction time)} &= \text{(carried over conduction time)} + \text{(average conduction time per year)} \\ &= \{\text{(upper limit conduction time)} - \text{(integrated conduction time until December 31 of previous year)}\} + \text{(average conduction time per year)}\end{aligned} \quad (1)$$

Meanwhile, when a carried over conduction time per week is obtained, (integrated conduction time until December 31 of the previous year) is replaced with (integrated conduction time until the previous week) and (average conduction time per year) is replaced with (average conduction time per week) in Equation (1). In addition, the controller 120 calculates a currently available number of ignitions using the following equation (2) by adding an average number of ignitions to a carried over number of ignitions per year to correct the currently available number of ignitions. Further, the controller 120 calculates a currently available number of rotations using the following equation (3) by adding an average number of rotations to a carried over number of rotations per year to correct the currently available number of rotations. Meanwhile, a first unit period is the previous year, the previous month, the previous week, the previous day, and the like in Equations (1) to (3). In addition, a second unit period after the first unit period is this year, this month, this week, today, and the like in Equations (1) to (3).

$$\begin{aligned}\text{(Available number of ignitions)} &= \text{(carried over number of ignitions)} + \text{(average number of ignitions per year)} \\ &= \{\text{(upper limit number of ignitions)} - \text{(integrated number of ignitions until December 31 of previous year)}\} + \text{(average number of ignitions per year)}\end{aligned} \quad (2)$$

$$\begin{aligned}\text{(Available number of rotations)} &= \text{(carried over number of rotations)} + \text{(average number of rotations per year)} \\ &= \{\text{(upper limit number of rotations)} - \text{(integrated number of rotations until December 31 of previous year)}\} + \text{(average number of rotations per year)}\end{aligned} \quad (3)$$

Figure 7:
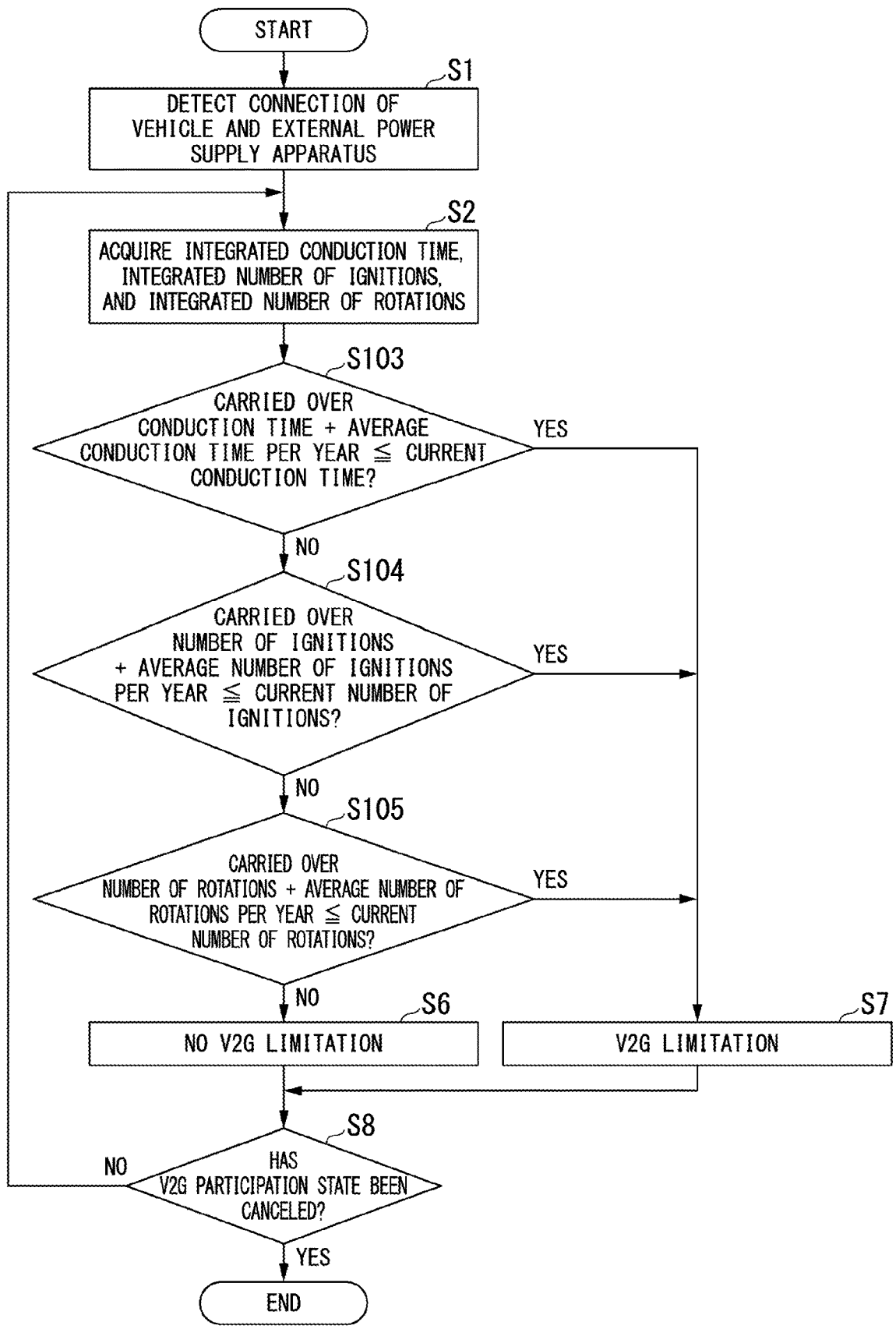
FIG. 7 is a flowchart of an example of a processing procedure of a V2G system according to a modified example of the embodiment.

Next, an example of processing to determine V2G participation for each period using such a carry-over will be described. FIG. 7 is a flowchart of an example of a processing procedure of the V2G system 1 according to the modified example of the present embodiment. Meanwhile, FIG. 7 shows an example of determination using upper limit values per year.

First, the control device 204 of the external power supply apparatus 200 performs processing which is the same as step S1 of FIG. 5. Then, the control device 204 of the external power supply apparatus 200 and the controller 120 of the management apparatus 100 perform processing which is the same as step S2 of FIG. 5.

Then, the controller 120 of the management apparatus 100 calculates a conduction time from January until now (hereinafter referred to as a current conduction time) by subtracting an integrated conduction time until the previous year stored in the storage 130 from an acquired integrated time. Subsequently, the controller 120 determines whether to limit V2G at an integrated conduction time by determining whether the current conduction time is equal to or greater than a value obtained by adding an average conduction time per year to a carried over conduction time (step S103).

When it is determined that the integrated conduction time is less than an upper limit conduction time and V2G limitation will not be performed in step S103, the controller 120 of the management apparatus 100 calculates the number of ignitions from January until now (hereinafter referred to as the current number of ignitions) by subtracting a number of ignitions until the previous year stored in the storage 130 from an acquired integrated number of ignitions. Then, the controller 120 determines whether to limit V2G at an integrated number of ignitions by determining whether the current number of ignitions is equal to or greater than a value obtained by adding an average number of ignitions per year to a carried over number of ignitions (step S104).

When it is determined that the integrated number of ignitions is less than an upper limit number of ignitions and V2G limitation will not be performed in step S104, the controller 120 of the management apparatus 100 calculates the number of rotations from January until now (hereinafter referred to as the current number of rotations) by subtracting a number of rotations until the previous year stored in the storage 130 from an acquired integrated number of rotations. Then, the controller 120 determines whether to limit V2G at an integrated number of rotations by determining whether the current number of rotations is equal to or greater than a value obtained by adding an average number of rotations per year to a carried over number of rotations (step S105).

When it is determined that the current number of rotations is less than the value obtained by adding the average number of rotations per year to the carried over number of rotations and V2G limitation will not be performed in step S105, the controller 120 of the management apparatus 100 does not perform V2G limitation. That is, the controller 120 permits participation in V2G. Subsequently, the controller 120 generates a V2G control instruction representing permission of participation in V2G and transmits the generated V2G control instruction to the external power supply apparatus 200 through the communication unit 110 and the network NW. Then, the control device 204 of the external power supply apparatus 200 performs control such that participation in V2G is permitted according to the received V2G control instruction (step S6). Alternatively, the vehicle controller 320 of the vehicle 300 may perform control such that participation in V2G is permitted according to the V2G control instruction output from the external power supply apparatus 200. Meanwhile, the vehicle controller 320 of the vehicle 300 continues integration of a conduction time, the number of ignitions, and the number of rotations.

When it is determined that the current conduction time is equal to or greater than the value obtained by adding the average conduction time per year to the carried over conduction time and V2G limitation will be performed in step S103, when it is determined that the current number of ignitions is equal to or greater than the value obtained by adding the average number of ignitions per year to the carrier over number of ignitions and V2G limitation will be performed in step S104, or when it is determined that the current number of rotations is equal to or greater than the value obtained by adding the average number of rotations per year to the carrier over number of rotations and V2G limitation will be performed in step S105, the controller 120 of the management apparatus 100 performs V2G limitation. That is, the controller 120 generates a V2G control instruction indicating that participation in V2G is not permitted.

Subsequently, the controller 120 transmits the generated V2G control instruction to the external power supply apparatus 200 through the communication unit 110 and the network NW. Then, the control device 204 of the external power supply apparatus 200 performs control such that only charging is performed according to the received V2G control instruction (step S7). Alternatively, the vehicle controller 320 of the vehicle 300 may perform control such that only charging is performed according to the V2G control instruction output from the external power supply apparatus 200. Meanwhile, the controller 120 may output at least one of an instruction representing that V2G limitation will be performed and an instruction representing that V2G limitation will not be performed to the external power supply apparatus 200 as a V2G control instruction.

Next, the control device 204 of the external power supply apparatus 200 and the controller 120 of the management apparatus 100 perform the same processing as step S8 of FIG. 5. The controller 120 of the management apparatus 100 ends processing when it is determined that V2G participation has been cancelled in step S8.

As described above, the controller 120 in the modified example can efficiently control V2G operation within upper limit values by adding a carry-over to an average value. In addition, the controller 120 controls V2G participation by comparing an upper limit value to which a carry-over has been added with a current integrated value. Further, the controller 120 calculates a current integrated value by subtracting an integrated value until the previous year stored in the storage 130 from an acquired integrated value. Meanwhile, the vehicle controller 320 of the vehicle 300 may output each integrated value for each period (one year, one month, one week or one day).

As described above, a carry-over is added to an upper limit value of the next year, for example, in the modified example. Therefore, according to the modified example, it is possible to efficiently perform traveling, charging, and V2G operation within upper limit values.

OPERATION EXAMPLES

Next, operation examples of the vehicle 300 will be described.

Figure 8:
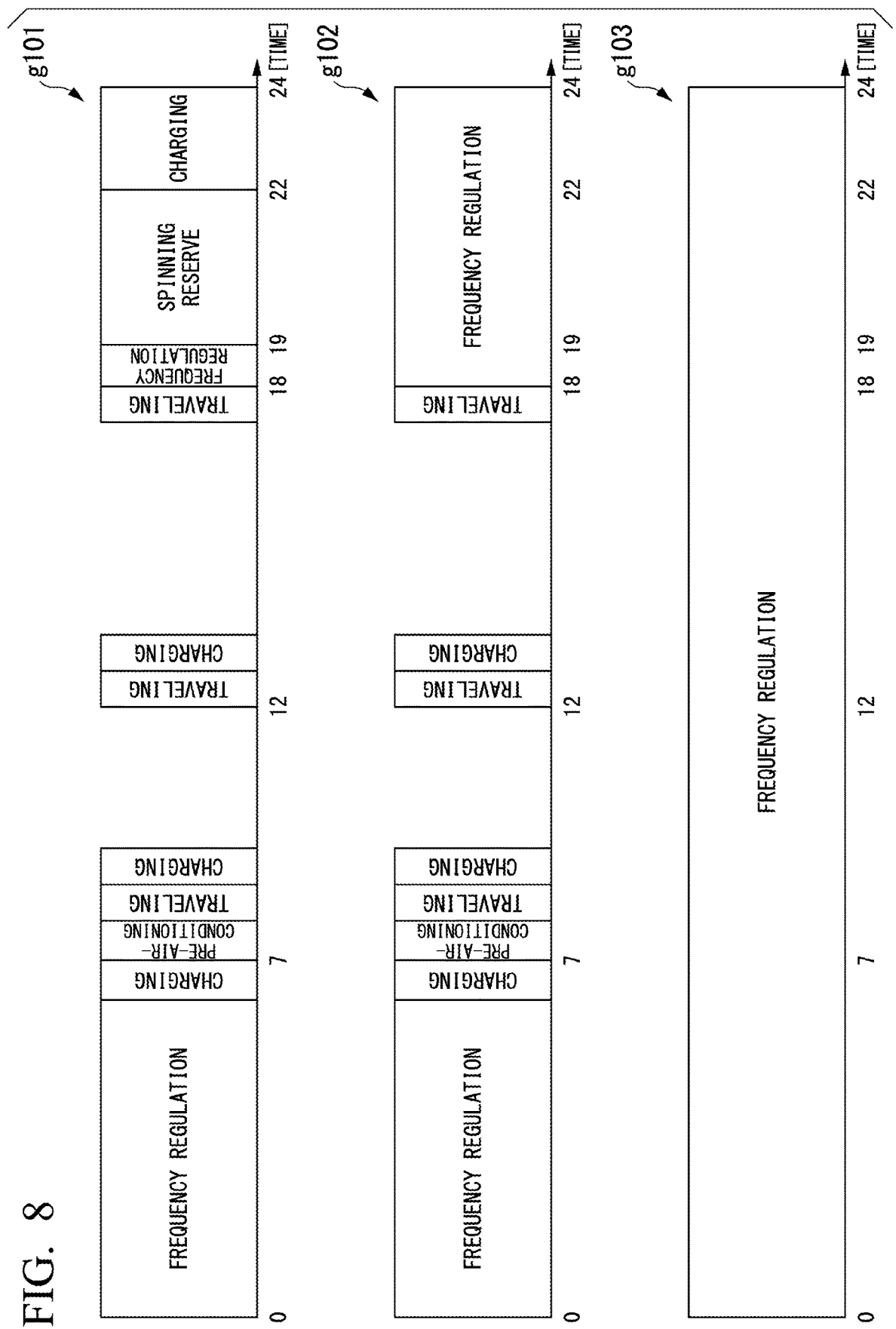
FIG. 8 is a diagram showing an example of operation of a vehicle for one day when the management apparatus does not limit participation in V2G at conduction integration time.

FIG. 8 is a diagram showing operation examples of the vehicle 300 for one day when the management apparatus 100 does not limit participation in V2G at a conduction integration time. Meanwhile, the horizontal axis represents time (hour) in FIG. 8.

In an operation example denoted by symbol g101 of FIG. 8, an electrical apparatus of the vehicle 300 conducts for operations represented below in the following time periods and the rotating machine 340 of the vehicle 300 rotates. Meanwhile, pre-air-conditioning is an air-conditioning operation before traveling.

| (Operation) | (Time period) |
|---|---|
| Frequency regulation | 0:00 to 6:00, 18:00 to 19:00 |
| Charging | 6:00 to 7:00, 8:00 to 8:45, 13:00 to 13:45, 22:00 to 24:00 |
| Pre-air-conditioning | 7:00 to 7:15 |
| Traveling | 7:15 to 8:00, 12:00 to 13:00, 17:00 to 18:00 |
| Spinning reserve | 19:00 to 22:00 |

In an operation example denoted by symbol g102 of FIG. 8, the electrical apparatus of the vehicle 300 conducts for operations represented below in the following time periods and the rotating machine 340 of the vehicle 300 rotates.

| (Operation) | (Time period) |
|---|---|
| Frequency regulation | 0:00 to 6:00, 18:00 to 24:00 |
| Charging | 6:00 to 7:00, 8:00 to 8:45, 13:00 to 13:45 |
| Pre-air-conditioning | 7:00 to 7:15 |
| Traveling | 7:15 to 8:00, 12:00 to 13:00, 17:00 to 18:00 |

In an operation example denoted by symbol g103 of FIG. 8, the electrical apparatus of the vehicle 300 conducts for an operation represented below in the following time period and the rotating machine 340 of the vehicle 300 rotates.

| (Operation) | (Time period) |
|---|---|
| Frequency regulation | 0:00 to 24:00 |

When participation in V2G is limited at the conduction integration time, the management apparatus 100 manages charging/discharging of the on-board battery 310 mounted in the vehicle 300 such that a number of rotations of the rotating machine 340 for one day falls within an upper limit number of rotations for one day for each of the operation examples (symbol g101, g102 and g103) shown in FIG. 8. Hereinafter, a number of rotations for each of the operation examples (symbols g101, g102 and g103) shown in FIG. 8 when charging/discharging of the on-board battery 310 is managed such that a number of rotations of the rotating machine 340 for one day falls within the upper limit number of rotations for one day will be described in detail with reference to FIG. 9. FIG. 9 is a diagram showing a number of rotations for each of the operation examples (symbols g101, g102 and g103) shown in FIG. 8 when charging/discharging of the on-board battery 310 is managed such that a number of rotations for one day falls within the upper limit number of rotations for one day. In FIG. 9, the vertical axis represents an integrated number of rotations for one day. In addition, symbol g111 denotes the upper limit number of rotations for one day.

A first operation denoted by symbol g121 of FIG. 9 corresponds to the operation example denoted by symbol g101 of FIG. 8. In this case, if the aforementioned management is not performed, a number of rotations obtained by summing a number of rotations Ta1 during traveling including pre-air-conditioning, a number of rotations Tb1 during charging, a number of rotations Ts1 during spinning reserve, and a number of rotations Tf1 during frequency regulation is the number of rotations for one day. However, since this summed number of rotations is equal to or greater than an upper limit number of rotations Tld for one day, the management apparatus 100 controls the number of rotations for one day such that it is kept below the upper limit number of rotations Tld by removing a part of the number of rotations Tf1 during frequency regulation.

In addition, a second operation denoted by symbol g122 of FIG. 9 corresponds to the operation example denoted by symbol g102 of FIG. 8. In this case, if the aforementioned management is not performed, a number of rotations obtained by summing a number of rotations Ta2 during traveling including pre-air-conditioning, a number of rotations Tb2 during charging, and a number of rotations Tf2 during frequency regulation is the number of rotations for one day. However, since this summed number of rotations is equal to or greater than an upper limit number of rotations Tld for one day, the management apparatus 100 controls the number of rotations for one day such that it is kept below the upper limit number of rotations Tld by removing a part of the number of rotations Tf2 during frequency regulation.

In addition, a third operation example denoted by symbol g123 of FIG. 9 corresponds to the operation example denoted by symbol g103 of FIG. 8. In this case, if the aforementioned management is not performed, a number of rotations Tf3 during frequency regulation is the number of rotations for one day. However, since this number of rotations during frequency regulation is equal to or greater than an upper limit number of rotations Tld for one day, the management apparatus 100 controls the conduction integration time for one day such that it is kept below the upper limit number of rotations Tld by removing a part of the number of rotations Tf3 during frequency regulation.

Meanwhile, although a number of rotations is described in FIG. 9, the controller 120 also monitors a conduction time and a number of ignitions, and when any of the conduction time, the number of ignitions, and the number of rotations exceeds an upper limit value for one day, controls a conduction integration time for one day such that it is kept below an upper limit conduction time or controls a number of rotations for one day such that it is kept below an upper limit number of rotations, for example, by limiting a part thereof during frequency regulation. In addition, although examples in which frequency regulation is performed have been represented in FIG. 8 and FIG. 9, the management apparatus 100 also performs operation of spinning reserve at the request of the power provider 400. Even in this case, when any of the conduction time, the number of ignitions and the number of rotations exceeds an upper limit value for one day, the management apparatus 100 controls the conduction integration time for one day such that it is kept below the upper limit conduction time or controls the number of rotations for one day such that it is kept below the upper limit number of rotations, for example, by limiting a part thereof during spinning reserve.

Meanwhile, the external power supply apparatus 200 or the vehicle 300 may include the function of the management apparatus 100 in the above-described example.

Furthermore, although V2G operation examples have been described in the above-described embodiment and modified example, the present invention is not limited thereto and may be applied to operation of vehicle to home (V2H). Meanwhile, V2H is an operation of supplying electric power stored in the on-board battery 310 to a house such that it is used at home. When V2H operation is performed, the vehicle controller 320 supplies electric power from the vehicle 300 to a house 260 of a user through the power transmission line 240 according to a result of operation of the user performed on the vehicle 300, the external power supply apparatus 200 or the terminal 500.

While forms for carrying out the present invention have been described using the embodiments, the present invention is not limited to these embodiments at all, and various modifications and substitutions can be made without departing from the gist of the present invention.

What is claimed is:

1. A management apparatus which manages electric power transfer between a power system and a secondary battery mounted in a vehicle and storing electric power for traveling, the management apparatus comprising:
   a storage configured to store an upper limit number of rotations of a rotating machine included in the vehicle; and a controller configured to acquire an integrated number of rotations of the rotating machine that is measured from a start time of a warranty period of the vehicle and to limit electric power transfer between the power system and the secondary battery when the integrated number of rotations is equal to or greater than the upper limit number of rotations.

2. The management apparatus according to claim 1, wherein, when the controller limits electric power transfer between the power system and the secondary battery, the controller does not limit electric power supply from the power system to the secondary battery and limits electric power supply from the secondary battery to the power system.

3. The management apparatus according to claim 1, wherein the integrated number of rotations is a value obtained by integrating a number of rotations of the rotating machine when the vehicle is traveling, a number of rotations of the rotating machine during charging of the secondary battery performed in order to increase a remaining capacity of the secondary battery to a predetermined level, and a number of rotations of the rotating machine when changing/discharging is performed between the secondary battery and the power system.

4. The management apparatus according to claim 1, wherein the controller calculates an upper limit number of rotations in a unit period, calculates a difference between the integrated number of rotations in a first unit period and a number of rotations of the rotating machine in the unit period, and corrects an upper limit number of rotations in a second unit period after the first unit period on the basis of the difference.

5. The management apparatus according to claim 1, wherein the storage further stores an upper limit conduction time with respect to an electrical apparatus included in the vehicle, and
the controller acquires an integrated conduction time of the electrical apparatus measured from the start time of the warranty period of the vehicle and limits electric power transfer between the power system and the secondary battery even when the integrated conduction time is equal to or greater than the upper limit conduction time.

6. The management apparatus according to claim 1, wherein the storage further stores an upper limit number of times of switching between an on state and an off state of an ignition key included in the vehicle, and
the controller acquires an integrated number of times of switching between the on state and the off state of the ignition key that is measured from the start time of the warranty period of the vehicle and limits electric power transfer between the power system and the secondary battery even when the integrated number of times of switching is equal to or greater than the upper limit number of times of switching.

7. A management method of a management apparatus which manages electric power transfer between a power system and a secondary battery mounted in a vehicle and storing electric power for traveling and includes a storage configured to store an upper limit number of rotations of a rotating machine included in the vehicle, the management method comprising:
acquiring an integrated number of rotations of the rotating machine that is measured from a start time of a warranty period of the vehicle; and
limiting electric power transfer between the power system and the secondary battery when the integrated number of rotations is equal to or greater than the upper limit number of rotations.

8. A computer-readable non-transitory storage medium storing a program causing a computer of a management apparatus which manages electric power transfer between a power system and a secondary battery mounted in a vehicle and storing electric power for traveling and includes a storage configured to store an upper limit number of rotations of a rotating machine included in the vehicle to:
acquire an integrated number of rotations of the rotating machine that is measured from a start time of a warranty period of the vehicle; and
limit electric power transfer between the power system and the secondary battery when the integrated number of rotations is equal to or greater than the upper limit number of rotations.

* * * * *